Dec. 5, 1944.  E. T. LAYNG ET AL  2,364,453
PROCESSING HYDROCARBON DISTILLATES
Filed Sept. 13, 1939  2 Sheets-Sheet 1

INVENTORS:
Edwin T. Layng
Vanderveer Voorhees
BY
Pike H. Sullivan
ATTORNEY

Patented Dec. 5, 1944

2,364,453

UNITED STATES PATENT OFFICE 2,364,453

PROCESSING HYDROCARBON DISTILLATES

Edwin T. Layng, Jersey City, N. J., and Vanderveer Voorhees, Hammond, Ind., assignors of one-half to Standard Oil Company, a corporation of Indiana, and one-half to The M. W. Kellogg Company, a corporation of Delaware Application September 13, 1939, Serial No. 294,789

13 Claims. (Cl. 196—50)

This invention relates to a process of converting hydrocarbon oils, particularly petroleum distillates of the character of naphtha and gasoline, into hydrocarbon motor fuels having a high antiknock value or knock rating. The invention relates more particularly to the catalytic treatment of heavy naphthas at high temperature to convert the straight or branched chain hydrocarbons as well as the cyclo-aliphatic hydrocarbons contained therein into aromatic hydrocarbons having a high knock rating when employed as motor fuel in internal combustion engines.

One object of the invention is to dehydrogenate petroleum hydrocarbons in the vapor phase at high conversion temperatures, upwards of 875° F., with solid contact type catalysts and in the presence of hydrogen. Another object is to employ relatively low hydrogen pressures whereby hydrogenation of the oil and its decomposition products is substantially avoided and said hydrocarbons are dehydrogenated and aromatized by the action of the catalyst with formation of ring compounds which are almost entirely of the aromatic hydrocarbon series.

Another object of the invention is to provide a method for regulating the temperature of the vapors undergoing dehydrogenation and particularly to compensate for heat losses and endothermic heat of reaction by introducing at spaced points preheated hydrocarbon gases containing hydrogen.

Still another object of the invention is to provide a method for continuously contacting naphtha vapors with a moving catalyst in the presence of hydrogen-containing gases and increasing the ratio of hydrogen to said naphtha vapors as the activity of the catalyst decreases with duration of operation.

Yet another object of the invention is to provide an improved method for utilizing hydrocarbon gases and hydrogen produced in the system for increasing the effectiveness of the aromatization, for example, by increasing their hydrogen concentration before returning them to the catalytic conversion system.

Figure 1:
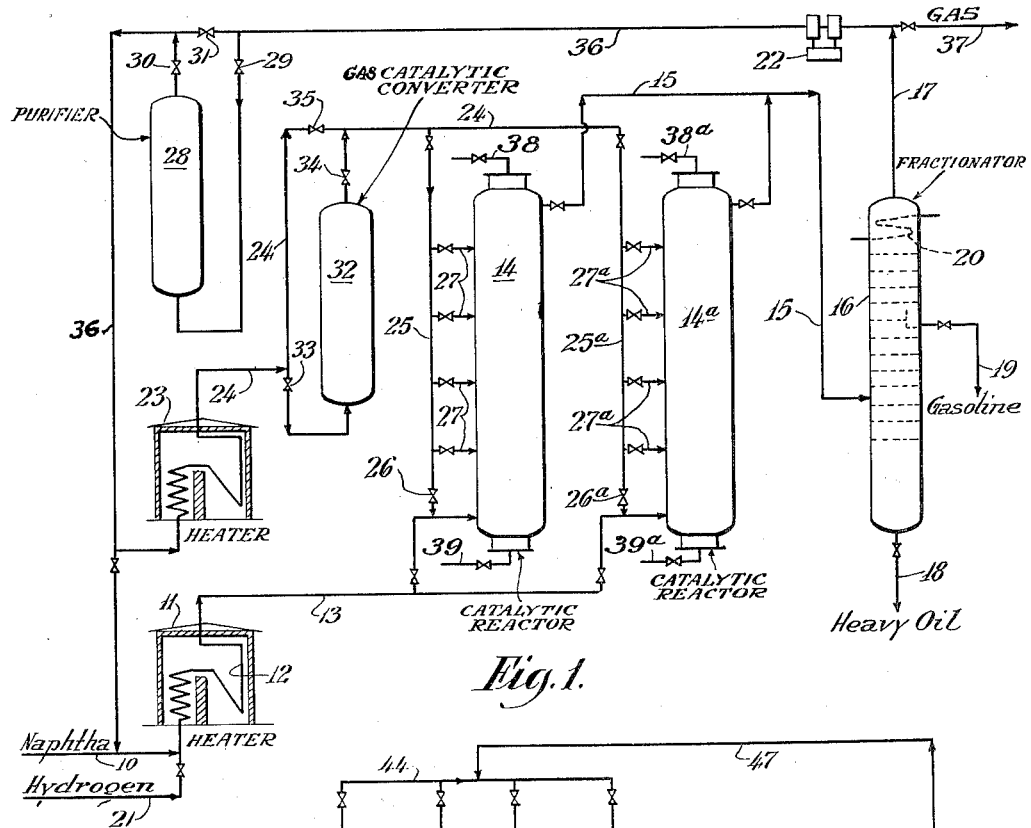
Figure 2:
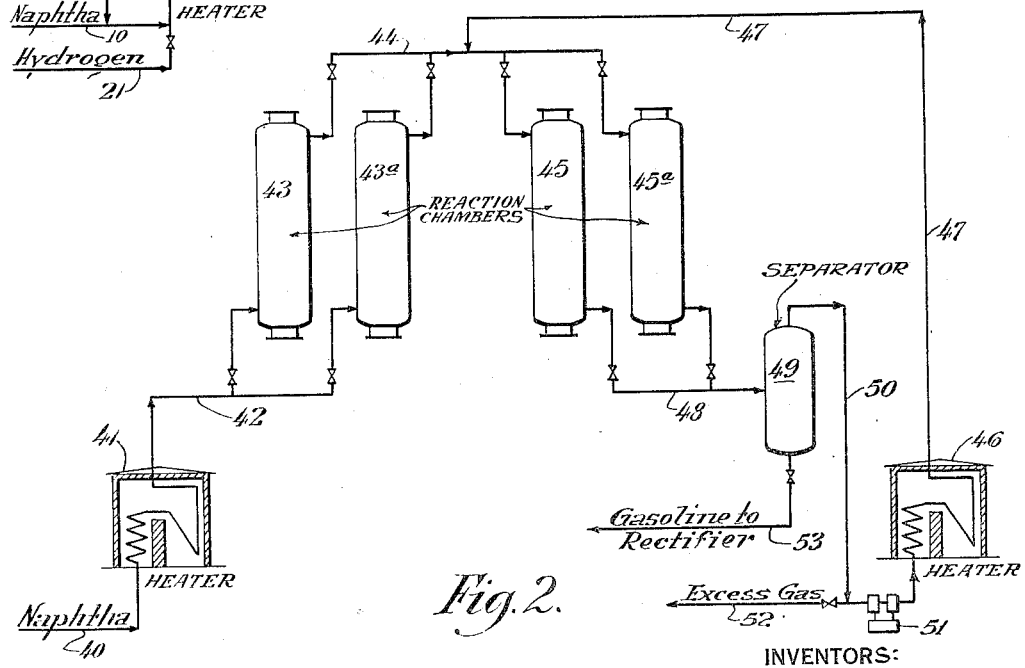
Figure 3:
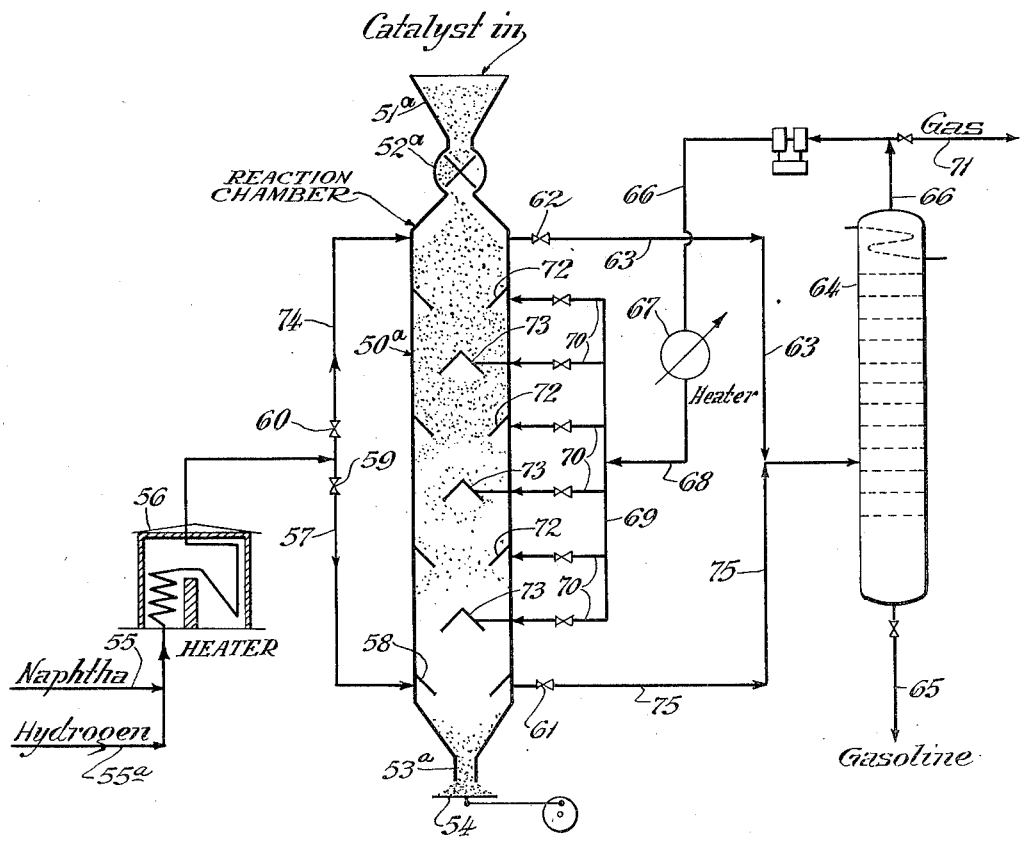

The invention is illustrated by drawings in which Figure 1 is a simplified flow diagram illustrating a process for converting low knock rating gasoline to high knock rating gasoline. Figure 2 shows a simplified form of the process in which the naphtha vapors are subjected to the aromatization catalyst in successive separate chambers with the introduction of preheated gas in between the separate stages of the conversion whereby the temperature of the vapors is substantially maintained. Figure 3 shows in elevation a cross section of a reaction chamber in which the catalyst is continuously or intermittently charged and discharged while naphtha vapors and hydrogen-containing gas are passed therethrough. Novel distributor means for dispersing the heating gas in the catalyst chamber are also shown in Figure 3.

Referring to Figure 1 of the drawings, a suitable naphtha, for example, East Texas heavy naphtha having an initial boiling point of about 250° F. and a final boiling point of about 425° F., is charged by line 10 to heater 11 where it is vaporized in coil 12 and the vapors are heated to a high temperature suitable for catalytic conversion. The hot vapors are conducted by line 13 to catalytic reactor 14. The average temperature of the vapors in the reactor may suitably be about 875 to 1075° F. and we prefer to employ a temperature of about 1000° F.

Reaction chamber 14 is filled with a suitable dehydrocyclization catalyst which may be an oxide of a metal of Groups IV, V or VI of the periodic system. Examples of such metals are titanium, zirconium, cerium, thorium, vanadium, columbium, chromium, molybdenum, tungsten, and uranium. The lefthand members or "A" class elements are preferred. These metals are characterized by the fact that their oxides are difficultly reducible. These oxide catalysts are preferably supported on alumina.

The catalyst is generally employed in the form of granules, the size of which may suitably be about 4 to 60 mesh providing a bed with sufficient porosity for the vapors to pass therethrough, although large particles or even powder may be used. The heated naphtha vapors entering the catalyst chamber 14 at the bottom pass uniformly upward through the chamber and depart therefrom by line 15 leading to fractionating tower 16 where the products are separated from gas which is withdrawn at the top of the fractionator by line 17. Products boiling above the desired gasoline range are withdrawn at the bottom by line 18 and may be recycled to the heater 11 if desired. Gasoline distillate is trapped out by line 19. Reflux coil 20 is provided to assist fractionation of the desired gasoline hydrocarbons from the gas. If desired, a light liquid fraction containing propane and butane may be separated from the tower above line 19.

Simultaneously with the introduction of naphtha vapors into reactor 14, there is also introduced hydrogen-containing gas, part of which may be obtained from an outside source and introduced by line 21, especially when starting up the process. After the operation has become established, however, we prefer to employ only hydrogen-containing rydrocarbon gas which is produced in the process, especially since our process produces net hydrogen. For this purpose the gas is conducted by line 17 and blower or compressor 22 to heater 23 wherein it is heated to a high temperature, generally within the range of 1200 to 2500° F. The heated gas is then passed by line 24 and manifold 25 to reaction chamber 14. Part of the heated recycle gas may be passed through valve 26 into the naphtha vapors in line 13, thereby raising the temperature of these vapors to the desired operating temperature and making it unnecessary to heat the naphtha vapors to this temperature in coil 12. Coking and thermal reforming in the coil 12 are thereby avoided.

An important problem in the dehydrocyclization of petroleum hydrocarbons and particularly in the dehydrocyclization of aliphatic hydrocarbons is that of maintaining the desired reaction temperature due to the highly endothermic nature of the reactions. Especially is this true where a mass of catalyst of extensive cross sectional dimension is employed without means for introducing heat by conduction from heated surfaces. Applicants have solved this problem by introducing the heated hydrogen-containing hydrocarbon gases into the hydrocarbon vapors undergoing cyclization at a succession of points in the catalyst reaction zone. Referring to Figure 1 again, the heated recycle gases are conducted through manifold 25 and thence through valve controlled connections 27 leading into the elongated reaction chamber 14. In order to prevent local overheating of the catalyst at the points of introduction of the hot gases, it is preferred to contact the gases first with the vapors passing through the reaction chamber. This may be accomplished by suitable baffles within the reaction chamber, which are not shown, but which may resemble those shown in Figure 3.

The amount of gas recycled in our process may suitably be about 1 to 12 times the volume of hydrocarbon naphtha vapors undergoing treatment. Where the amount of gas recycled is large, it will not be necessary to heat it to such a high temperature in heater 23 and the temperature may suitably be about 1200 to 1600 or 1800° F. The amount of gas being recycled will depend largely upon the character of the naphtha treated, the activity and condition of the catalyst employed in chamber 14, the hydrogen concentration of the gas, and on other operating factors. In general, we prefer to recycle sufficient gas to maintain an average hydrogen to naphtha mol ratio of about 5 although this may vary from about 0.4 to 20 mol ratio.

The composition of the recycle gas varies considerably depending chiefly on the activity and particularly the age of the catalyst. As catalyst life approaches expiration, it is found that the hydrogen content of the gas diminishes. For example, the hydrogen content may be about 90% by volume at the beginning of operation with fresh catalyst and it may fall to about 40 to 60% by volume as catalyst activity decreases. The remaining constituents of the recycled gas obtained from fractionator 16 are mostly gaseous hydrocarbons, particularly methane and $C_2$ hydrocarbons as well as smaller amounts of $C_3$ and $C_4$ hydrocarbons. It is desirable to employ sufficient hydrocarbon gas admixed with the hydrogen to increase the apparent molecular weight above about 4, thereby raising the heat capacity of the gas materially. Hydrogen sulfide also is a common impurity in the recycled gas and it is generally desirable to remove it by passing the gas through an iron oxide purifier 28 by regulating valves 29, 30 and 31. Other means of purification may be employed to remove hydrogen sulfide and/or undesirable nitrogen compounds.

If the hydrocarbon content of the gas becomes excessive a portion of the hydrocarbons contained in the recycle gas may be converted into hydrogen and carbon by operating heater 23 at a sufficiently high temperature to provide gas pyrolysis, and pyrolysis of the gas with production of hydrogen may be further increased by conducting the heated gas from heater 23 through catalytic converter 32 by regulating valves 33, 34 and 35. Converter 32 may be charged with a suitable pyrolysis catalyst, for example, oxides of chromium, iron, nickel, aluminum, etc., suitably deposited on carriers such as activated silica, silica gel, kieselguhr, etc. Acid treated clays, Florida earth, bentonite, and similar materials also may be used to increase the production of hydrogen from the recycled gases. The temperature of converter 32 may be about 1000 to 1500° F., and the catalyst may be regenerated at intervals.

If desired, a portion of the recycled gases may be conducted by line 36 to the naphtha charged to heater 11 thereby assisting in regulating the performance of heater 11 and increasing the heat input to reaction chamber 14 by the vapors in line 13. The net hydrogen produced in the process and not needed for recycling may be discarded with the gases vented from the system by line 37.

A parallel reaction chamber 14a may be provided to be used alternately with chamber 14 when the catalyst therein becomes sufficiently deactivated by use, which may be in from 5 to 20 hours. The catalyst in chamber 14 may then be regenerated by passing oxidizing gas therethrough by means of connections 38 and 39. Similarly, reactor 14a may be regenerated through connections 38a and 39a. When carrying out the regenerating operation, all valves leading hydrocarbon gas or vapors into the reaction chamber are closed and the catalyst is swept with an inert gas such as $CO_2$, $N_2$ or flue gas. An oxidizing gas, for example, air diluted with inert gas, such as flue gas, steam, $N_2$, etc., is then introduced at one end of the chamber, for example, at the bottom end at a temperature above the ignition temperature, i. e., about 750 to 900° F. The concentration of oxygen in the oxidizing gas is preferably regulated to control the oxidation rate and avoid heating the catalyst to an excessively high temperature. In general, it is desirable to avoid heating the catalyst on regeneration to a temperature exceeding about 1200 to 1400° F., although certain catalysts may be regenerated at temperatures of about 1500 to 1600° F. without appreciable injury. The regenerating temperature will depend on the particular catalyst employed and in some cases it may be desirable to regenerate at temperatures not exceeding about 1100° F.

One of the characteristics of our dehydrocyclization catalysts is that on regeneration the combustion of carbonaceous matter adhering to the catalyst tends to become highly localized in the catalyst bed. The regeneration accordingly proceeds by the progression of a localized hot zone or hot spot through the catalyst bed, beginning at the point of introduction of oxidizing gas. Our process enables us to reduce the time required for regeneration by introducing oxidizing gas at a plurality of points, thus producing a plurality of progressive regenerating zones or hot spots and this enables us to effect catalyst regeneration in a shorter time and/or with less intensive heating of the catalyst as would occur were all the catalyst regenerated by the progression therethrough of a single combustion zone or hot spot.

Instead of regenerating the catalyst in situ in the manner just described, it may be removed from the reaction chamber and replaced by fresh catalyst. By employing two reaction chambers in parallel, it is possible to continue the operation of the conversion unit, without interruption, practically indefinitely. The life of the catalyst between the regeneration periods will ordinarily be about 15 to 20 hours or more, depending partly on the amount and concentration of the hydrogen introduced into the catalytic reactor with the hydrocarbon vapors. If the concentration of hydrogen is allowed to fall much below about .4 mol of hydrogen per mol of hydrocarbon vapor treated, the life of the catalyst will be shortened and more frequent regeneration will be required to remove carbonaceous material from the catalyst. It is, therefore, essential in our process to maintain the proper ratio of hydrogen to naphtha in the reaction zone, generally within the range of about 0.4 to 20 mols of hydrogen per mol of hydrocarbon treated.

The pressure employed in our conversion process is preferably within the range of about 30 lbs. to 450 lbs. per square inch. Appreciably higher pressures are unsatisfactory as they result in hydrogenation rather than dehydrogenation of the hydrocarbons treated, and the desired net production of hydrogen will not then be obtained. A pressure of about 150 to 250 lbs. per square inch is satisfactory. We also prefer to operate our process with a catalyst contact time, expressed by the time factor or space velocity of about 0.1 or 0.2 to 25, which is the length of time in hours required to pass one volume of liquid naphtha charge over one volume of catalyst. The volume of catalyst referred to is the gross space occupied by the catalyst rather than the gross catalyst chamber volume. As a typical example, we may employ a time factor of about 1. It will be observed that the time factor is substantially unaffected by the amount of gas recycled at various points of the process inasmuch as it is based on the volume of liquid feed rather than the volume of naphtha vapor.

In Figure 2 we have described an alternative modification of the apparatus shown in Figure 1 whereby the catalyst is employed in a succession of separate reaction zones. Referring to Figure 2, naphtha feed is introduced by line 40 into heater 41 where it is vaporized and heated to a conversion temperature, e. g., 875 to 1050° F. The heated vapors pass by line 42 to reaction chamber 43 which is substantially filled with dehydrocyclizing catalyst.

A substantial temperature drop occurs in 43 as a result of the endothermic dehydrocyclization reactions taking place therein. The temperature of the vapor, for example, may fall from 1050° F. at the inlet to 900° F. at the outlet of the reaction zone. The partially treated hydrocarbon vapors are then conducted by line 44 to a second reaction chamber 45 similarly charged with dehydrocyclizing catalyst. Before entering the second reaction zone, however, hot recycled gas from heater 46 is introduced into the vapors by line 47, the temperature of the recycled gas being sufficient to raise the temperature of the vapors to the desired reaction temperature, for example, 1025 to 1050° F. Again, the temperature falls in passing through catalytic reacting zone 45 as a result of the endothermic dehydrogenation therein. The products are withdrawn by line 48 and pass to separator 49 where the gases under pressure are separated from the liquid products. The gases, consisting chiefly of hydrogen together with some hydrocarbons, are withdrawn by line 50 and pump 51, heated in heater 46 and recycled to the system. Excess gas is vented from the system by line 52. Liquid products are removed from the separator 49 by line 53 by which they may be conducted to a suitable rectifier. Alternate standby reaction chambers may be provided for use when regenerating or replacing the catalyst.

Instead of operating our process with catalyst in a fixed bed we may employ apparatus wherein the catalyst is maintained in a moving stream as shown in Figure 3. Referring to Figure 3, 50a represents an elongated vertical or inclined reaction chamber provided with means for continuously or intermittently introducing the catalyst at the upper end from a vestibule or hopper 51a and rotating or shutoff valve 52a. As the catalyst progresses downward through the chamber 50a it becomes gradually deactivated and is withdrawn at the bottom continuously or intermittently through outlet 53a feeding onto rocker plate 54. It should be understood that the outlet 53a may be suitably enclosed within a chamber and sufficient pressure maintained therein to prevent the escape of vapors from the reaction zone. Likewise, instead of continuously withdrawing the catalyst by means of the device shown, we may employ a catalyst receptacle or vestibule which is valved in a way to isolate it from the reaction zone and permit withdrawing the catalyst at intervals.

In operating with the moving catalyst, naphtha is introduced at line 55, preferably accompanied by hydrogen introduced at 55a and vaporizing heater 56 wherein it is heated to a high temperature of the order of 850 to 1050° F. It may then be conducted by line 57 to the lower end of the reaction chamber 50a and we prefer to introduce it below baffle 58 as indicated. Baffle 58 may be a frusto-conical ring attached to the inner wall of the reaction chamber 50a, the angle of the cone being sufficiently steep to allow the catalyst descending through the reaction chamber to flow over it. When charging hot vapor to the base of reactor 50a, valve 59 will be open while valves 60 and 61 will be in the closed position.

The naphtha vapors pass upward through the catalyst chamber and are withdrawn through valve 62 and line 63 leading to fractionator 64 wherein gasoline is separated by line 65 and uncondensed gases are withdrawn by line 66 and recycled through heater 67 and thence by line 68 leading to manifold 69. The hot gases, for example, at a temperature of 1600 to 1800° F., are then introduced into the reaction chamber 50a through valved connections 70. Excess gas, undesired in the system, may be vented by line 71.

We prefer to employ baffle means in reactor 50a to provide spaces corresponding to and connected with each gas inlet 70. These may be suitable frusto-conical ring baffles 72, alternately interspersed with inverted bucket or cone baffles 73. As the naphtha vapors rise through the reaction chamber and enter the vapor spaces beneath the baffles, they are there mixed and heated by the hot hydrogen-containing gas introduced. The temperature of the naphtha vapors is thereby restored to the desired average reaction temperature which is in the range of 875 to 1075° F. without locally overheating and coking the catalyst at the points of gas introduction. At the same time it is desirable to have the catalyst follow a tortuous path downward through the reaction chamber to prevent channelling and segregation of gases and vapors. By introducing the hot cycle gas at a plurality of points, we also find that more uniform operating temperatures are obtained, and, therefore, better efficiency is obtained from the catalyst throughout the reaction zone.

In some cases we find it desirable to operate the reaction chamber 50a concurrently instead of countercurrently in which case valves 59 and 62 may be closed and valves 60 and 61 may be opened to permit naphtha vapors to flow through line 74 into chamber 50a and out at line 75. By operating in this way, it is possible to increase the concentration of hydrogen in the reacting vapors progressively through the catalyst chamber thereby maintaining a higher hydrogen concentration in the lower part of the reaction chamber where the catalyst is most nearly spent. As a result, thermal cracking reactions are prevented or diminished in that region where catalyst activity is least, and we obtain a more selective dehydrocyclization of the naphtha than is ordinarily obtained in this type of process. Thus, for example, we may employ a hydrogen mol ratio of about 0.4 to 1 in the upper end of the reaction zone with fresh catalyst, and increase this to about 10 to 1 at the exit end. In the same way, we may increase the temperature progressively as naphtha vapors pass through the catalyst bed from the most active to the least active zones, for example, from 900° F. at the fresh catalyst end to 1075° F. at the catalyst discharge end. This is conveniently done by introducing larger amounts of hot recycled gases through connections 70. The products are withdrawn by line 75 leading to fractionator 64 as previously described.

Although we have described our invention as it may be applied to certain specific operations, we intend that it be limited only by the following claims:

We claim:

1. The process of aromatizing petroleum hydrocarbon motor fuels whereby their antiknock rating is increased which comprises vaporizing said motor fuel and heating the vapors to a temperature above about 875° F., conducting the heated vapors into an elongated reaction zone, therein contacting the vapors in the presence of hydrogen with a moving steam of granular solid dehydrocyclization catalyst whereby aliphatic hydrocarbons contained in said motor fuel are converted into aromatic hydrocarbons and hydrogen-containing hydrocarbon gases, separating said hydrogen-containing hydrocarbon gases from the products of said contacting reaction, heating said gases to a temperature between about 1200 and 2500° F. and introducing them while hot into said catalyst stream, controlling the amount of heated gases introduced to maintain the temperature of said contacting zone above about 875° F. and increase the concentration of hydrogen as the activity of said catalyst decreases, the ratio of hydrogen-to-naphtha hydrocarbons being continuously maintained within the range of 0.4 to 20 mol ratio.

2. The process of claim 1 wherein the said dehydrocyclization catalyst is a difficultly reducible oxide of a metal of Group VI of the periodic system.

3. The process of aromatizing paraffinic naphtha which comprises vaporizing and heating said naphtha to a high conversion temperature, contacting said naphtha vapor concurrently with a stream of moving dehydrocyclization catalyst in an elongated reaction zone, withdrawing the catalyst and vaporous products from said reaction zone, cooling and separating said vaporous products into an aromatic motor fuel fraction and a hydrogen-containing gaseous fraction, heating said hydrogen-containing gaseous fraction to an elevated temperature above the temperature of the reaction zone and introducing said heated gases into said reaction zone at a plurality of successive points in the direction of catalyst movement therein whereby the concentration of hydrogen in said reaction zone is progressively increased as the catalyst activity decreases.

4. The process of claim 3 wherein the naphtha vapors flowing through said elongated catalyst zone are separated from said catalyst into vapor pockets at successive points in said catalyst zone and the heated gases which are recycled are introduced into said pockets and mixed with the naphtha vapors therein before contacting with said catalyst.

5. The process of claim 3 wherein the amount and temperature of the gases introduced into said reaction zone are regulated to provide a progressive increase in temperature of the reaction zone as the catalyst activity decreases.

6. The process of converting low knock rating aliphatic naphthas into high knock rating aromatic motor fuels which comprises initially vaporizing and heating said naphtha to a high conversion temperature and passing the heated vapors with hydrogen through an elongated catalyst contact zone filled with a porous solid dehydrocyclization catalyst wherein the temperature is at first lowered due to endothermic conversion, continuously maintaining a ratio of hydrogen-to-naphtha hydrocarbons within the range of 0.4 to 20 mol ratio, withdrawing the vapors from said catalyst zone and separating them into a liquid fraction containing the desired motor fuel and a gaseous fraction containing fixed hydrocarbon gases and hydrogen, heating said gases to a high temperature sufficient to substantially convert said fixed hydrocarbon gases into hydrogen and while still above the temperature of said catalyst zone introducing said heated gases into said elongated catalyst zone in an amount sufficient to supply the heat of conversion of said naphtha and return the temperature to a point above the temperature to which said naphtha was initially heated.

7. The process of claim 6 wherein the said gases, after heating and before introducing into said catalyst zone are contacted with a dehydrogenation catalyst whereby the conversion of said fixed hydrocarbon gases is facilitated.

8. In the process of increasing the knock rating of petroleum naphtha consisting substantially of aliphatic hydrocarbons of six carbon atoms and more by subjecting said naphtha to the action of a solid aromatizing catalyst at aromatization temperature whereby said aliphatic hydrocarbons of six carbon atoms and more are converted into aromatic hydrocarbons, the improvement comprising vaporizing and heating said naphtha in absence of catalyst to conversion temperature but below the temperature desired for aromatization, immediately transferring the resulting vapors to an elongated catalytic conversion zone before any appreciable thermal conversion occurs, contacting said vapors in said conversion zone in the presence of hydrogen with a moving stream of solid dehydrocyclization catalyst at a pressure substantially below that required for hydrogenation and within the range of about 30 to 450 pounds per square inch, withdrawing the vapors from said catalyst zone and separating them into a liquid fraction containing the desired high knock rating naphtha and a gaseous fraction consisting essentially of normally gaseous hydrocarbons and hydrogen produced in the aromatization reaction, heating said gaseous fraction to a temperature between 1200 and 2500° F. and recycling it while at said temperature to said catalyst zone in an amount sufficient to raise the temperature of said zone to the desired aromatization temperature and supply all the endothermic heat required for the conversion reaction, the amount of said recycled gases being also sufficient to produce a concentration of hydrogen in said catalyst zone within the range of about .4 to 20 mols of hydrogen per mol of naphtha hydrocarbons treated.

9. The process of claim 8 wherein the pressure within said catalyst zone is maintained within the range of about 150 to 250 lbs. per square inch.

10. The process of claim 8 wherein the temperature of said catalyst zone is maintained at about 875 to 1075° F.

11. The process of claim 8 wherein the time of contact between the naphtha and the catalyst in said catalyst zone is expressed by the time factor of from 0.1 to 25.

12. The process of aromatizing petroleum hydrocarbon motor fuels whereby their antiknock rating is increased which comprises vaporizing said motor fuel and heating the vapors to a temperature above about 875° F., conducting the heated vapors into an elongated catalyst contacting zone, therein contacting the vapors with a dehydrocyclization catalyst whereby aliphatic hydrocarbons contained in said motor fuel are converted into aromatic hydrocarbons and hydrogen-containing hydrocarbon gases, separating said hydrogen-containing hydrocarbon gases from the products of said contacting reaction, heating said gases to a temperature between about 1200 and 2500° F. and introducing them while hot into said catalyst contacting zone at a plurality of spaced points between the points of introduction and exit of said motor fuel vapors, controlling the amount of heated gases introduced to maintain the temperature of said contacting zone above about 875° F., and to provide an increase in the temperature of said contacting zone in the direction of the vapor exit.

13. The process of aromatizing petroleum hydrocarbon motor fuels whereby their antiknock rating is increased which comprises vaporizing said motor fuel and heating the vapors to a temperature above about 875° F., conducting the heated vapors into an elongated catalyst contacting zone, therein contacting the vapors with a dehydrocyclization catalyst whereby aliphatic hydrocarbons contained in said motor fuel are converted into aromatic hydrocarbons and hydrogen-containing hydrocarbon gases, separating said hydrogen-containing hydrocarbon gases from the products of said contacting reaction, heating said gases to a temperature between about 1200 and 2500° F. and introducing them while hot into said catalyst contacting zone at a plurality of spaced points between the points of introduction and exit of said motor fuel vapors, controlling the amount of heated gases introduced to maintain the temperature of said contacting zone above about 875° F., and to provide a progressive increase in temperature from the inlet of said motor fuel hydrocarbon vapors to the vapor outlet of said contacting zone.

EDWIN T. LAYNG.
VANDERVEER VOORHEES.